US012417662B2

(12) United States Patent
Dao

(10) Patent No.: US 12,417,662 B2
(45) Date of Patent: Sep. 16, 2025

(54) CONTROLLING DOORS USING INTERFACE TECHNOLOGY WITH STEPS

(71) Applicant: Jeanelle Dao, San Jose, CA (US)

(72) Inventor: Jeanelle Dao, San Jose, CA (US)

( * ) Notice: Subject to any disclaimer, the term of this patent is extended or adjusted under 35 U.S.C. 154(b) by 96 days.

(21) Appl. No.: 18/537,770

(22) Filed: Dec. 12, 2023

(65) Prior Publication Data

US 2024/0203179 A1 Jun. 20, 2024

Related U.S. Application Data

(60) Provisional application No. 63/432,643, filed on Dec. 14, 2022.

(51) Int. Cl.
*G07C 9/00* (2020.01)

(52) U.S. Cl.
CPC ..... *G07C 9/00182* (2013.01); *G07C 9/00817* (2013.01)

(58) Field of Classification Search
CPC ... E05B 39/00; E05B 39/007; G07C 9/00174; G07C 9/00182; G07C 9/00817; G07C 2009/00825
USPC .......................................................... 70/263
See application file for complete search history.

(56) References Cited

U.S. PATENT DOCUMENTS

| | | | | |
|---|---|---|---|---|
| 10,692,312 | B1 * | 6/2020 | Niranjayan | G07C 9/25 |
| 2016/0138305 | A1 * | 5/2016 | Noguchi | E05B 81/58 70/263 |
| 2016/0358433 | A1 * | 12/2016 | Johnson | H04W 4/80 |
| 2017/0124859 | A1 * | 5/2017 | Lee | G08C 23/02 |
| 2017/0230509 | A1 * | 8/2017 | Lablans | H04J 13/0033 |
| 2017/0263065 | A1 * | 9/2017 | Johnson | E05B 45/06 |
| 2018/0179786 | A1 * | 6/2018 | Johnson | E05B 45/06 |
| 2018/0340350 | A1 * | 11/2018 | Johnson | G07C 9/00944 |
| 2019/0177993 | A1 * | 6/2019 | Shell | E04H 1/12 |
| 2020/0242575 | A1 * | 7/2020 | Shell | A61L 2/22 |
| 2020/0265662 | A1 * | 8/2020 | Maiga | G07C 9/00174 |
| 2020/0349786 | A1 * | 11/2020 | Ho | G06V 40/172 |
| 2022/0341217 | A1 * | 10/2022 | Cristache | G06Q 30/01 |

* cited by examiner

*Primary Examiner* — Nathan Cumar
(74) *Attorney, Agent, or Firm* — Lowenstein Sandler LLP

(57) ABSTRACT

Embodiments are directed to a step pad door lock system that processes the rhythm, pressure, and/or sequence of a user's steps on a pad. The step pad door lock system locks and unlocks doors based on the rhythm, pressure, and/or sequence of steps. If the rhythm, pressure, and/or sequence is the same as a user-defined predetermined rhythm, pressure, and/or sequence (acting as the password), the door unlocks.

18 Claims, 8 Drawing Sheets

CONTROLLING DOORS USING INTERFACE TECHNOLOGY WITH STEPS

RELATED APPLICATIONS

This patent application claims the benefit under 35 U.S.C. § 119(e) of U.S. Provisional Application No. 63/432,643, filed Dec. 14, 2022, which is incorporated by reference herein in its entirety.

TECHNICAL FIELD

Embodiments of the present invention relate to a means and apparatus for locking and unlocking a door using a sequence of footsteps on a pressure-sensitive pad.

BACKGROUND

Devices for locking and unlocking doors remotely are coming onto the market. Most of these devices work using remote keys or apps, but all of them require the user to input codes by hand. Such locking device pose a problem to users with full hands, for example after returning home carrying bags full of groceries. Such locking devices can also pose problems to users that are limited by a disability.

BRIEF DESCRIPTION OF THE DRAWINGS

The present invention is illustrated by way of example, and not by way of limitation, in the figures of the accompanying drawings and in which.

DETAILED DESCRIPTION

Embodiments of the invention are directed to a method and apparatus for locking and unlocking a door using a sequence of footsteps on a pressure-sensitive pad (referred to herein as a step pad). Embodiments of the invention make use of a basic knowledge of mechanical engineering, electrical engineering, and computer programming.

Embodiments of the present invention are directed to a mechanical and electronic system for locking and unlocking a door using a sequence of footsteps on a pressure-sensitive pad, referred to herein as a step pad door lock system.

Figure 1:
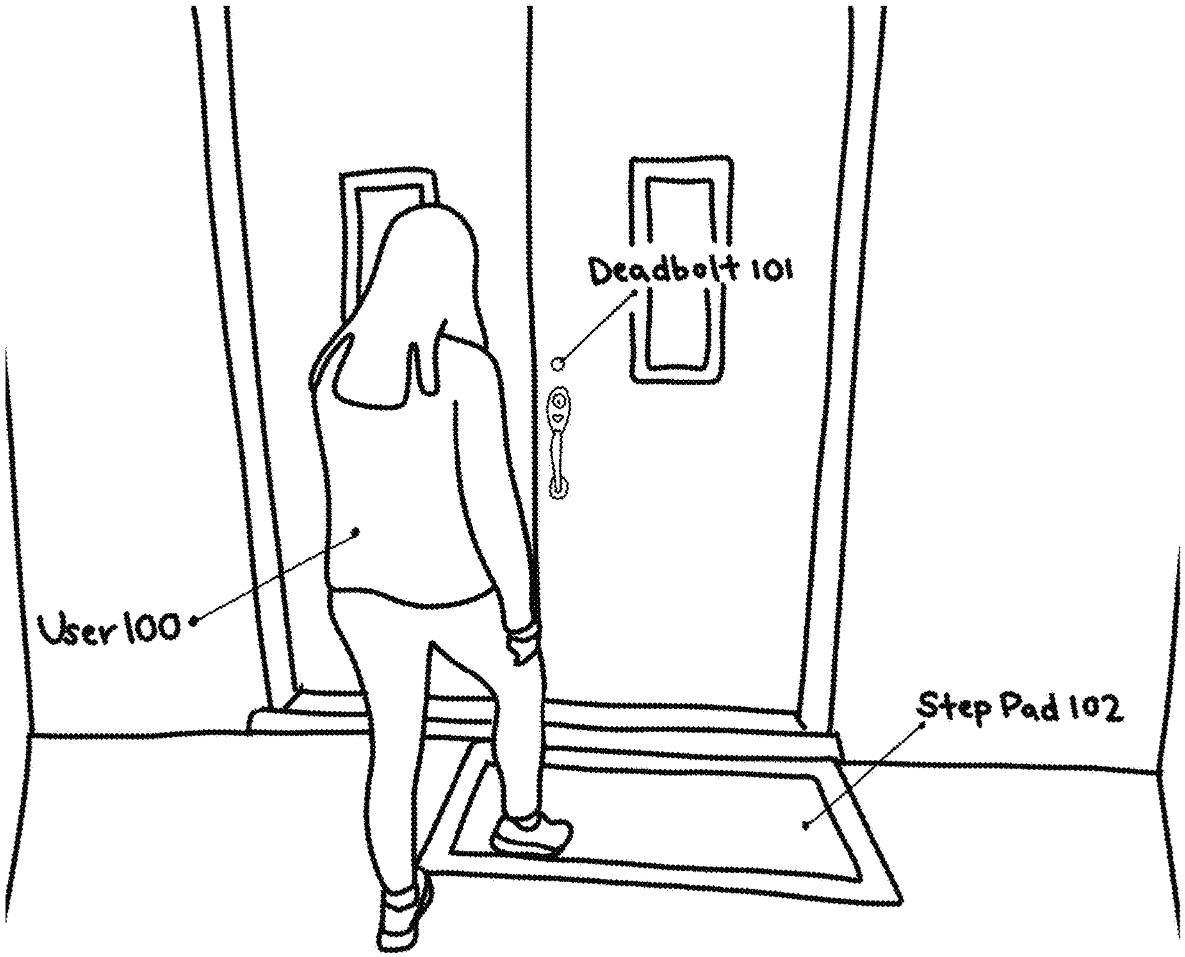
FIG. 1 shows one embodiment of a step pad door lock system in use.

FIG. 1 shows an embodiment of the step pad door lock system in use. A user 100 steps on a step pad 102 in a particular sequence of steps. Step pad 102 consists of a sensor which is underneath the step pad and out of sight, assuming the step pad is faceup. If the sequence of steps matches a previously set unlocking sequence, deadbolt 101 unlocks. If the sequence matches a previously set locking sequence, deadbolt 101 locks. If the sequence does not match the locking or unlocking sequence, deadbolt 101 does not change state.

Figure 2:
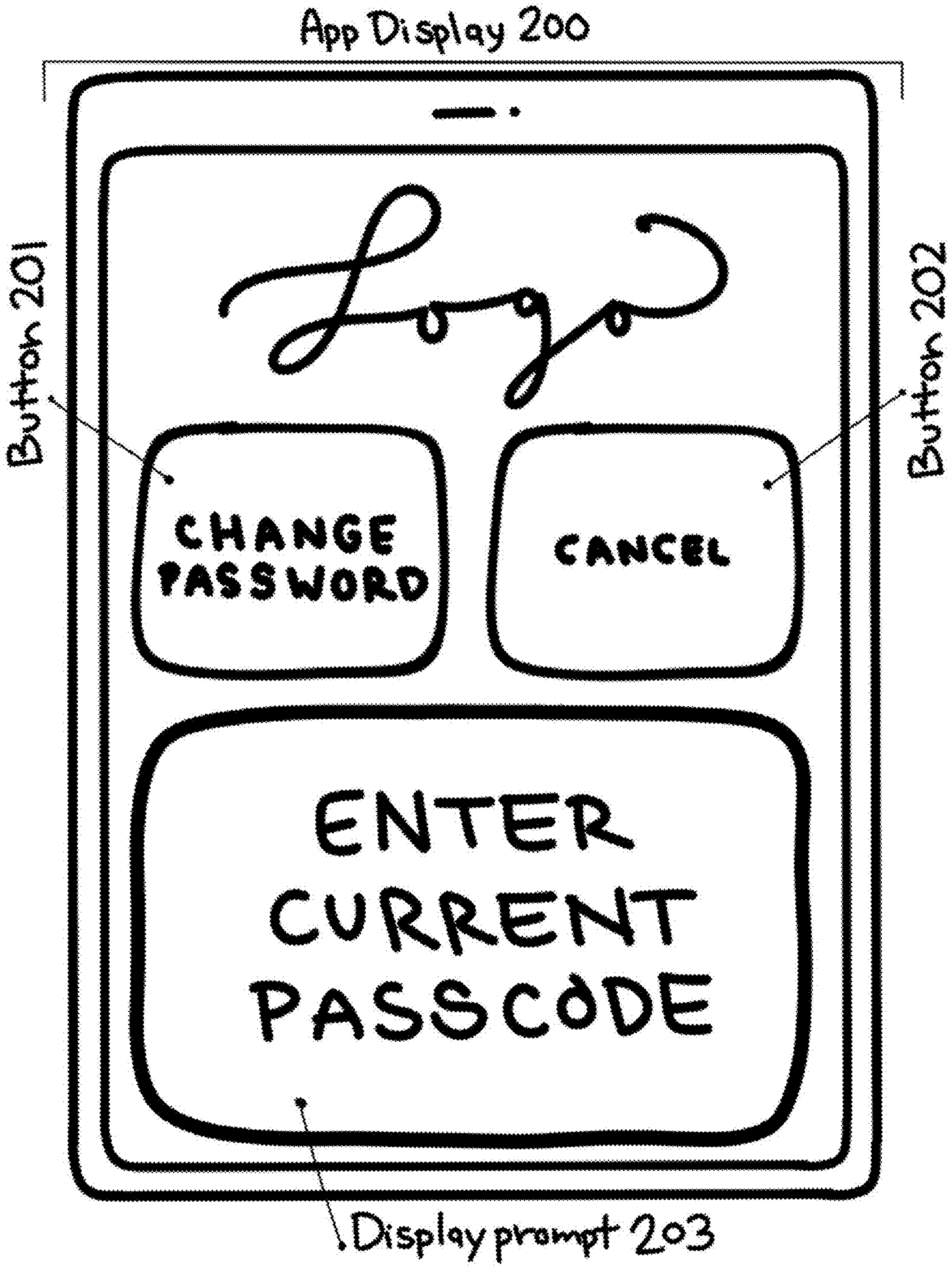
FIG. 2 shows one embodiment of an application (app) that is used to set parameters of a step pad door lock system.

FIG. 2 shows an embodiment of an app of the step plate door lock system that is used to set parameters of the step plate door lock system. A display 200 of the application (e.g., a graphical user interface) is displayed on a smartphone, tablet, computer, or similar computing device. A button 201 may be pressed by a user to record a change in a stored password sequence, also called the password. A button 202 may be pressed by the user to cancel a password change. A display prompt 203 may be pressed by the user to allow the user to enter a passcode that verifies that the user is authorized to change the password.

In one embodiment, when the user steps on the step pad, a microcontroller in the step pad registers that a switch has been pressed down. When the user takes their foot off the step pad, the step pad microcontroller registers that the switch has been released. When the switch has been pressed down, it is recorded in a data structure as a signal. This signal is then stored in a sequence of signals. In one embodiment, the step pad microcontroller then calculates how long the user stepped on the step pad by measuring how long a signal is active. The step pad microcontroller then puts the step event data into a data structure in memory storage for later use.

The step pad microcontroller accesses the most recent step event lengths in the data structure, so that every time the user steps on the step pad, the step pad microcontroller adds the new step event length data into the data structure. The step pad microcontroller also checks or compares if the recent sequence of step event lengths is the same (within a certain amount of time leeway) as the predetermined sequence, which is also called the password. If so, the microcontroller may send a wireless radio transmission to the deadbolt lock's receiver to command it to unlock the door. Alternatively, the step pad may have a wired connection to the deadbolt and may send a wired transmission to the deadbolt to cause it to unlock the door. The stored password sequence can be set at the time of manufacture, chosen by the user, or changed by the user.

In one embodiment, if one of the step lengths is greater than a certain amount of time, the step pad microcontroller detects this step event length as a sequence to command the deadbolt to lock.

In embodiments, whenever the user steps on the pad, unlocks the deadbolt, or locks the deadbolt, indicator lights signal the state of the step pad or of the lock.

In one embodiment, to reprogram the password, an electronic device is wirelessly connected to the step pad. After completing a series of actions such as entering a password update mode, inputting the current password, inputting the new password, and verifying the new password, the stored password sequence will be changed until the user changes it again. Throughout this process, indicator lights 405 will blink and flash to communicate different phases in the password changing sequence.

Figure 3:
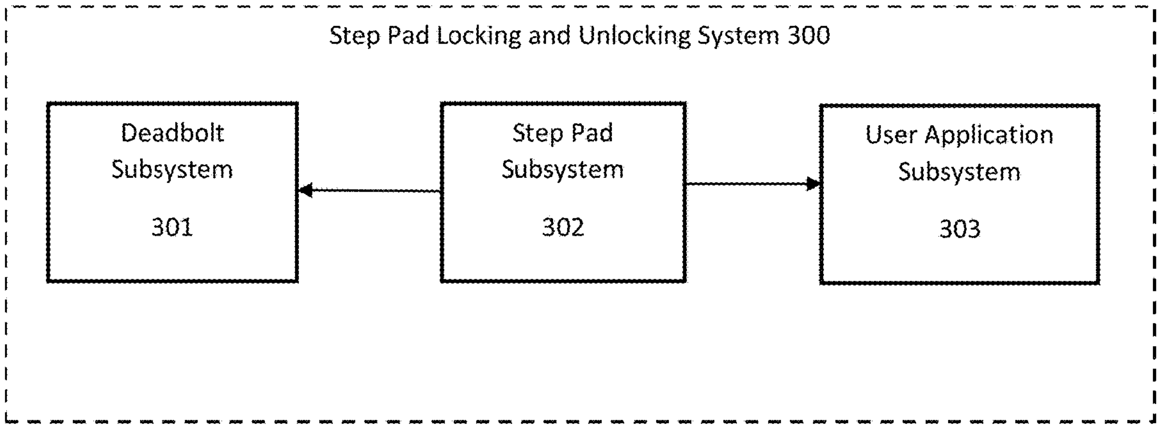
FIG. 3 shows basic functional blocks of one embodiment of a step pad lock system including a deadbolt subsystem, a step pad subsystem, and a user application subsystem.

FIG. 3 shows basic functional blocks of one embodiment of the step pad door lock system (also referred to as a step pad locking and unlocking system 300), which may include a deadbolt subsystem 301, a step pad subsystem 302, and a user application subsystem 303. In some embodiments, these subsystems communicate wirelessly. Alternatively, these subsystems may have wired connections, and may communicate via the wired connections.

Figure 4:
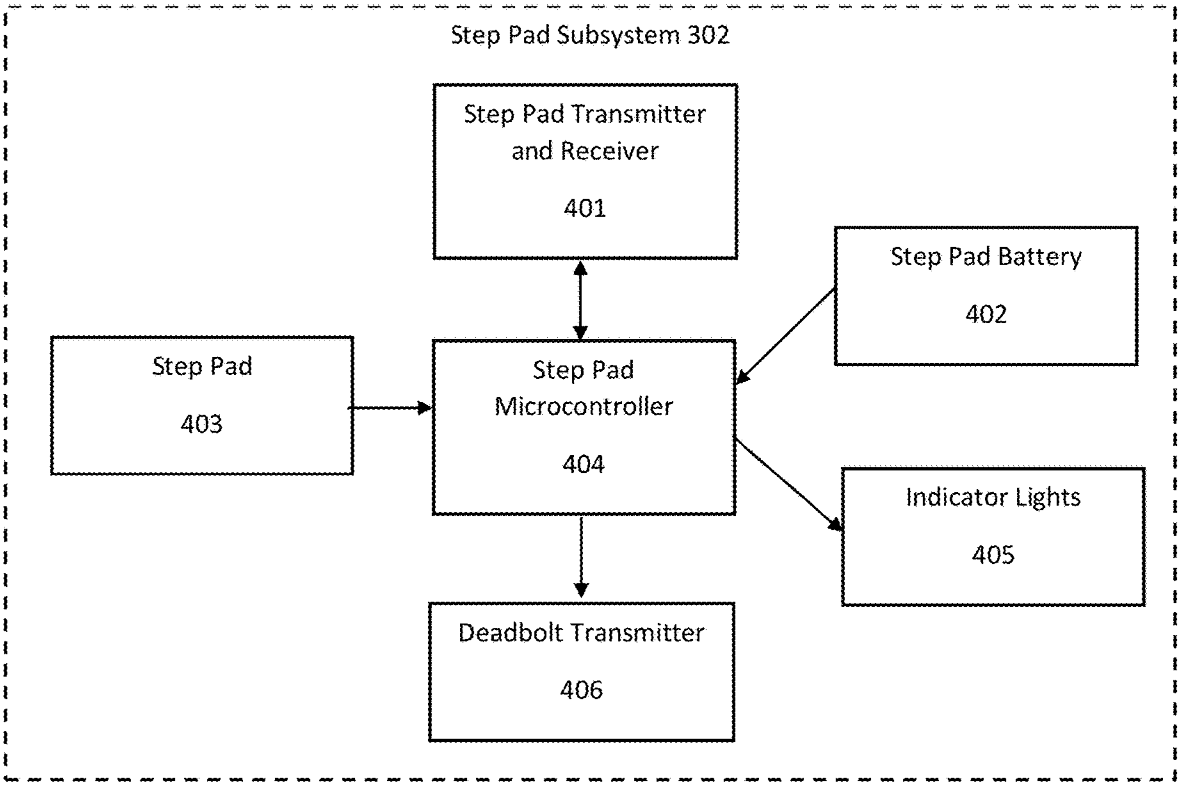
FIG. 4 shows basic functional blocks of one embodiment of a step pad subsystem.

FIG. 4 shows basic functional blocks of one embodiment of the step pad subsystem 302. In one embodiment, a step pad microcontroller 404 transmits from two transmitters, where one transmitter communicates with the deadbolt subsystem and the other transmitter communicates to the user application subsystem. The microcontroller also receives inputs from the step pad sensor switch and a receiver that communicates from the user application subsystem. In some embodiments, the microcontroller controls indicator lights.

Step pad microcontroller 404 locks and unlocks a door wirelessly through radio transmissions in some embodiments. In one embodiment, a radio receiver and motor in the door's deadbolt lock opens and closes the deadbolt door lock. Step pad microcontroller 404 also sends and receives signals via step pad transmitter and receiver 401 in some embodiments to communicate with electronic devices such as a cell phone or other mobile device so that a software app executing on the cell phone or other mobile device can communicate the state and operation of the step pad to a user based on the steps. Deadbolt transmitter 406 is configured to send a signal to deadbolt subsystem 301. Depending on the steps, different signals will be transmitted. In one embodiment, an unlock signal will be sent to the deadbolt subsystem 301 if the user's steps match the stored password sequence. If the user's steps do not match the stored password sequence within the predetermined leeway, a lock signal will be transmitted. When deadbolt microcontroller 502 receives a lock or unlock signal from deadbolt transmitter 406, deadbolt microcontroller 502 will send a corresponding signal to deadbolt motor 504 to lock or unlock the deadbolt. Indicator lights 405 may conveniently communicate the state and operation of step pad 403 to the user. Some embodiments of this are the lights blinking white when detecting a new step, blinking green when deadbolt subsystem 301 unlocks, or blinking red when deadbolt subsystem 301 locks.

Step pad microcontroller 404 is battery-powered by removable step pad battery 402 in some embodiments. Alternatively, step pad microcontroller 404 may be powered by a wired power connection (e.g., to a wall outlet). For the battery powered configuration, the unit lasts a long period of time (e.g., one or more years) before step pad battery 402 needs to be changed or recharged. The battery life may be extended by using a low-power sleep mode in step pad microcontroller 404 when step pad 403 has not been stepped on for a threshold period of time. An example of such a threshold period of time is fifteen seconds. In sleep mode, battery consumption is very low, and the step pad door lock system wakes up after a certain event, such as connecting with the user application or the user stepping on the mat. Upon waking, indicator lights 405 will all flash.

Figure 5:
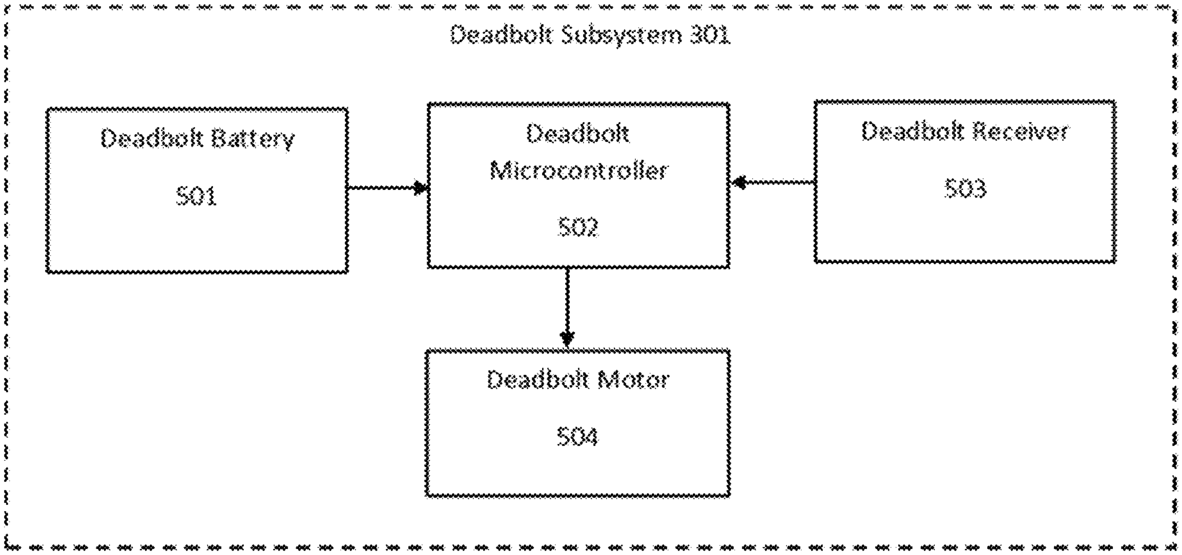
FIG. 5 shows basic functional blocks of one embodiment of a deadbolt subsystem.

FIG. 5 shows basic functional blocks of one embodiment of deadbolt subsystem 302. Deadbolt microcontroller 502 controls a deadbolt motor 504 to lock and unlock a deadbolt accordingly. The microcontroller also receives inputs from the deadbolt receiver. Deadbolt microcontroller 502 is battery-powered by removable deadbolt battery 501 in one embodiment. The unit lasts a long period of time before deadbolt battery 501 needs to be changed or recharged. The battery life is extended by using a low-power sleep mode in deadbolt microcontroller 502 when deadbolt receiver 503 has not received a signal for a threshold period of time. Deadbolt receiver 503 is configured to receive signals from deadbolt transmitter 406 in step pad subsystem 302. An example of such a specific period of time is fifteen seconds. In sleep mode, battery consumption is very low, and the deadbolt microcontroller wakes up after deadbolt receiver 503 receives a signal. In some embodiments, deadbolt microcontroller is connected to a wired power source (e.g., a wall outlet).

Figure 6:
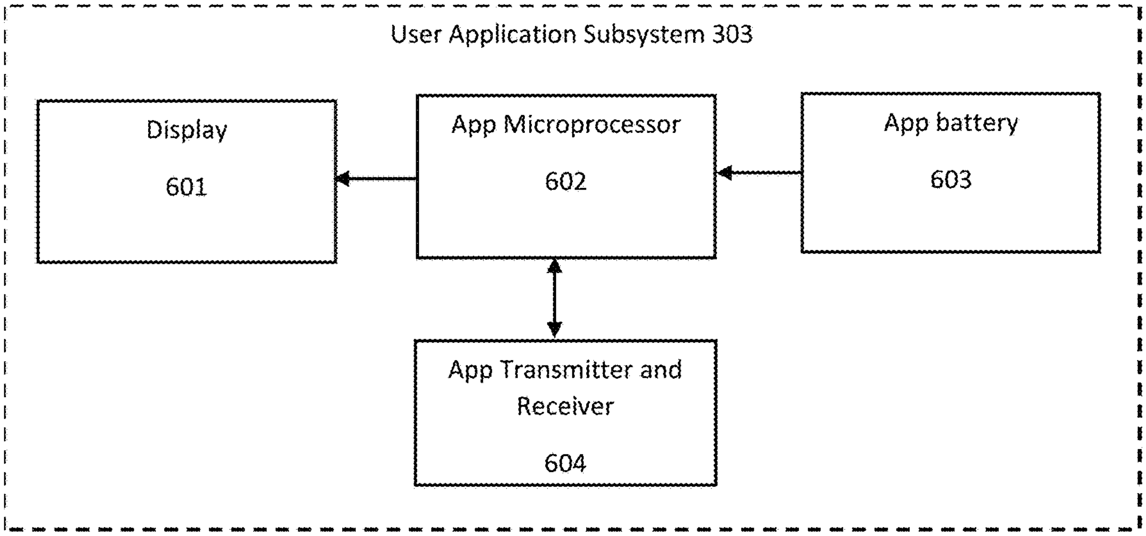
FIG. 6 shows basic functional blocks of one embodiment of a user application subsystem.

FIG. 6 shows basic functional blocks of one embodiment of user application subsystem 303. In one embodiment an app microprocessor 602 is connected to app battery 603, app transmitter and receiver 604, and display 601. App transmitter and receiver 604 can utilize Bluetooth or Wi-Fi or another wireless transmitting protocol. The components of the user application subsystem 303 are typical components of a common consumer electronics device such a cell phone or tablet in embodiments. App microprocessor 602 gets power from app battery 603, gets inputs from wireless signals received by app transmitter and receiver 604, and sends out signals using app transmitter and receiver 604. Display 601 presents the user interface to the user.

Figure 7:
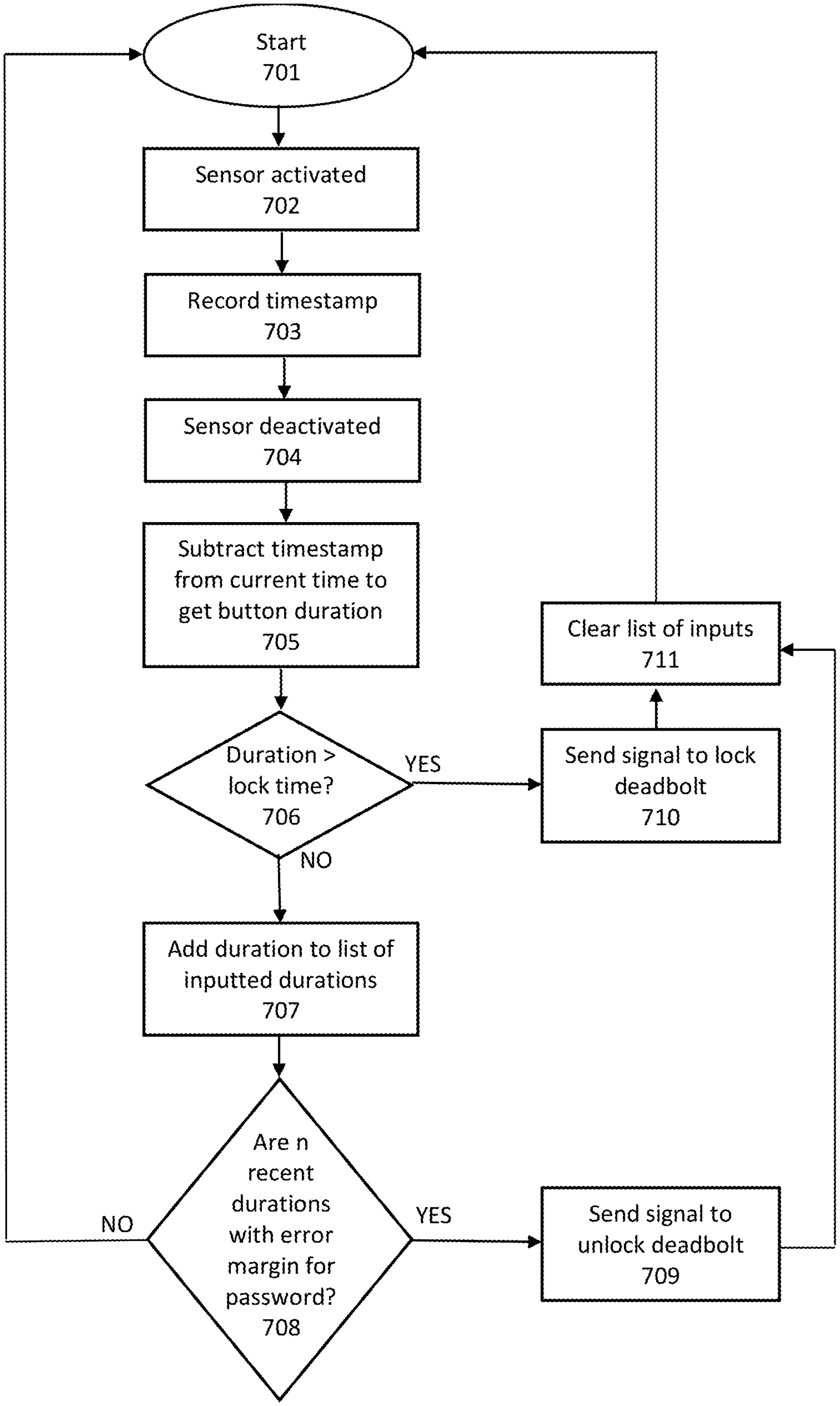
FIG. 7 shows one embodiment of an unlocking and locking flowchart for a step pad lock system.

FIG. 7 shows one embodiment of a process for unlocking and locking a deadbolt within step pad subsystem 302. The process starts in block 701. When a user steps on step pad 403, a sensor within step pad 403 is activated at block 702 and step pad microcontroller 404 stores a timestamp in memory at block 703. When the user stops stepping on step pad 403, the sensor is deactivated at block 704 and step pad microcontroller 404 calculates how long the user stepped on step pad 403 based on the current timestamp and the stored timestamp at block 705. There is a predetermined "lock time" for how long the user must step on the step pad to send a lock signal. At block 706, step pad microcontroller 404 determines if the length of the button press is longer than this lock time. If so, step pad microcontroller 404 sends a signal to lock a deadbolt in block 710. The list of inputs is cleared in block 711 and the process returns to the start block 701. This algorithm and the sequence of step event lengths may be modified for several buttons and include positional data as well as duration data. Positional data includes any data about what region of the step pad has been stepped on. Embodiments may have two or more buttons, and the sequence of step event lengths includes what region of the step pad was stepped on and for how long.

If the length of the button press is less than the lock time as determined in block 706, then the step event duration is pushed onto a list of inputted duration values at block 707. In one embodiment, in block 708, step pad microcontroller 404 determines whether the n most recent inputted step event lengths (n being the length of the password) are within an error margin to the corresponding stored password sequence. If so, step pad microcontroller 404 sends an unlock signal to the deadbolt in block 709. The error margin can be, for example, around 100 to 500 milliseconds. The list of inputs is cleared in block 711 and the process returns to the start block 701.

Figure 8:
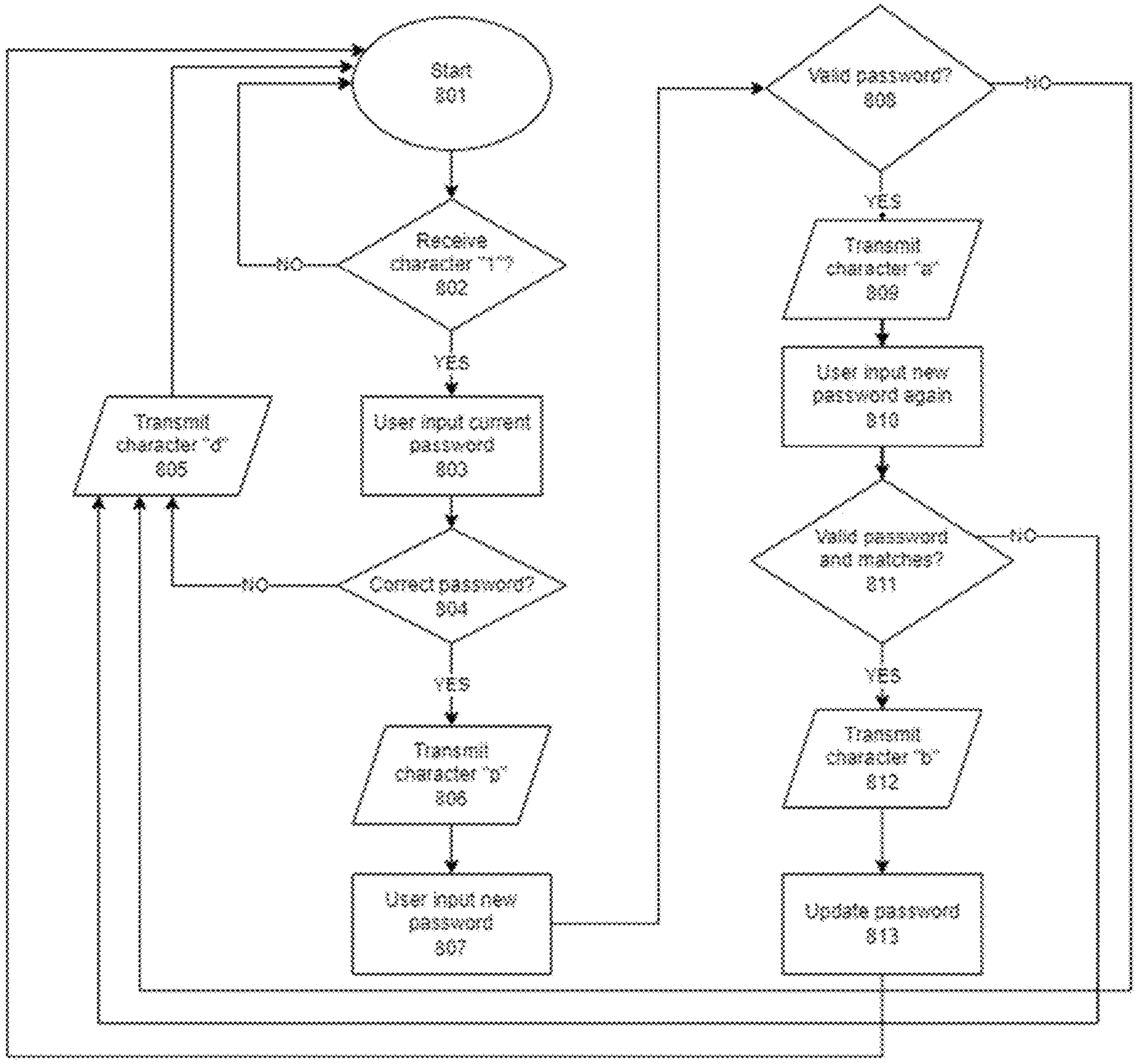
FIG. 8 shows one embodiment of a process for changing a password in a step pad subsystem of a step pad door lock system.

FIG. 8 shows one embodiment of a process for changing the stored password sequence in the step pad subsystem 302. The process starts at block 801. In block 802, step pad microcontroller 404 determines if it has received the character "1." If not, step pad microcontroller 404 goes back to block 801 to start the process over again. If so, a user enters the current password at block 803. In block 803, step pad microcontroller 404 receives a password from a user and in block 804 determines if the user has input the correct password by comparing it to the stored correct password. If so, the character "p" is transmitted in block 806 to user application subsystem 303. Otherwise, the character "d" is transmitted in block 805 to user application subsystem 303. In block 807, step pad microcontroller 404 receives a new password from the user. Block 808 determines if the new password received in block 807 is valid. If so, the letter "a" is transmitted in block 809 to user application subsystem 303. Otherwise, the character "d" is transmitted in block 805 to user application subsystem 303. In block 810, step pad microcontroller 404 again receives an additional sequence of signals from the user. This additional sequence of signals is turned into an additional sequence of step event lengths. In block 811, step pad microcontroller 404 determines if the additional sequence of step event lengths inputted from block 810 is valid and matches the password that it previously stored from block 807. If so, the character "b" is transmitted in block 812 to user application subsystem 303, and the stored password sequence is updated in memory in block 813 before the process returns to start block 801. Otherwise, the character "d" is transmitted in block 805.

Note that at any time in the process, if a cancel button is pressed on the app, the user application subsystem 303 will transmit a "2" to the step pad subsystem 302. In step pad subsystem 302, step pad transmitter and receiver 401 may always be able to receive a "2". Upon receiving a "2", the process in FIG. 8 restarts at block 801.

Figure 9:
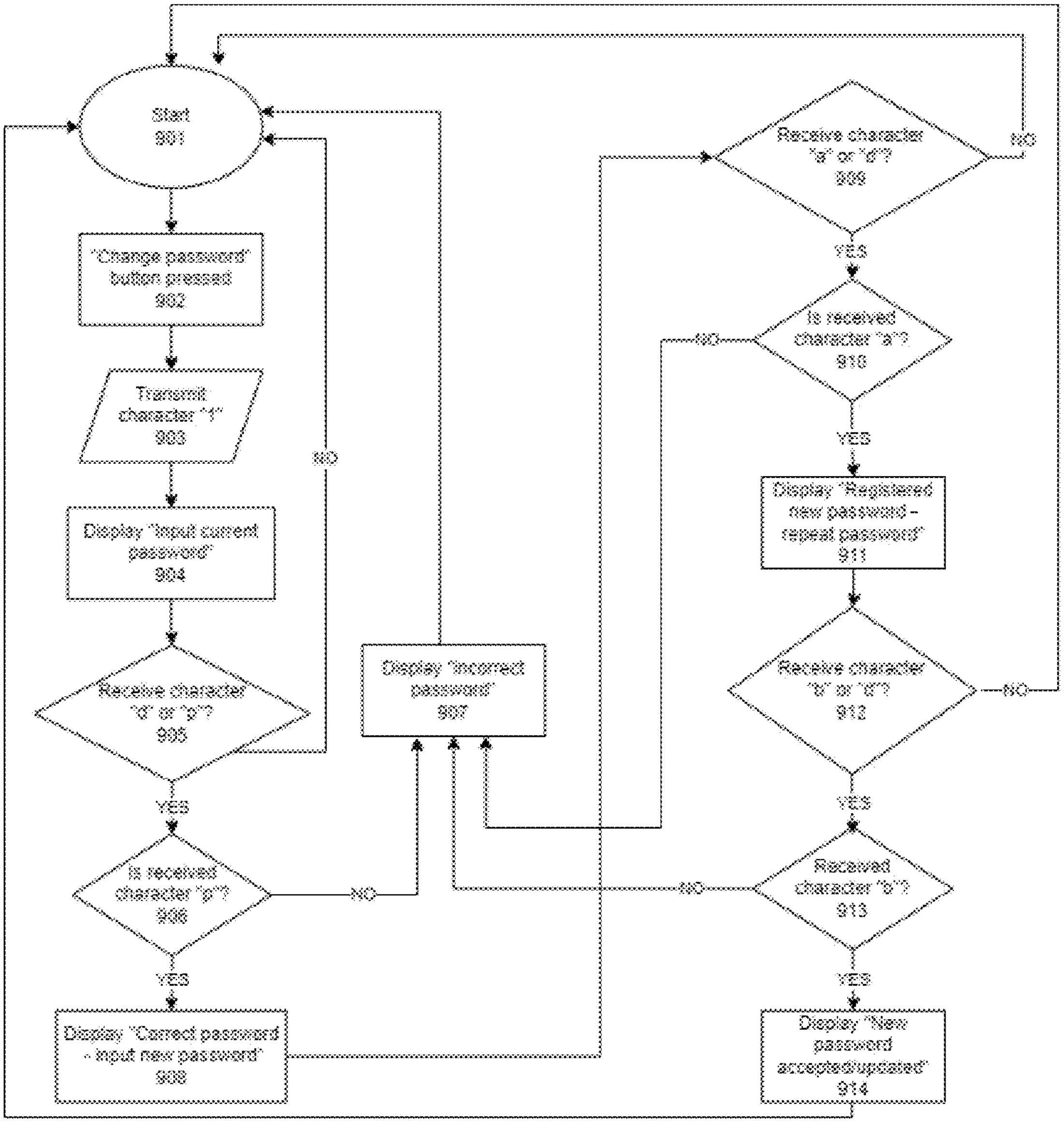
FIG. 9 shows one embodiment of a process for changing a password in a user application subsystem of a step pad door lock system.

FIG. 9 shows one embodiment of a process for changing a password in the user application subsystem 303. The process begins at start block 901. App microprocessor 602 receives a signal that a user pressed a change password button in block 902. Once the change password button is pressed, at block 903, user application Subsystem 303 transmits the character "1" to step pad subsystem 302. This transmission of character "1" serves as a request. Upon receiving this request, the step pad and application enter a password update mode. The words, "Input current password" are displayed on display 601 at block 904. App microprocessor 602 determines if it received the character "d" or "p" from user application subsystem 303 at block 905. If not, block 905 goes back to block 901 to start the process over again. If a "d" or "p" has been received, block 906 determines if the character "p" was received in block 905. If so, display 601 shows "correct password-input new password" on block 908. Otherwise, the words "incorrect password" is displayed on display 601 on block 907. After block 908, app microprocessor 602 determines if it received the character "a" or "d" from user application subsystem 303 at block 909. If not, block 909 goes back to block 901 to start the process again. If an "a" or "d" has been received, block 910 determines if the character "a" was received in block 909. If so, display 601 shows "Registered new password-repeat password" in block 911. Otherwise, "incorrect password" is displayed on display 601 in block 907. Following block 911, app microprocessor 602 determines if it received the character "b" or "d" from user application subsystem 303 at block 912. If not, block 912 goes back to block 901 to start the process again. If a "b" or "d" has been received, app microprocessor 602 determines if the character "b" was received in block 913. If so, display 601 shows "new password accepted/updated" in block 914 before returning to the start of the process at block 901. Otherwise, "incorrect password" is displayed on display 601 in block 907. Whenever app microprocessor 602 in user application subsystem 303 is at block 907, the process in FIG. 9 restarts at block 901.

Figure 10:
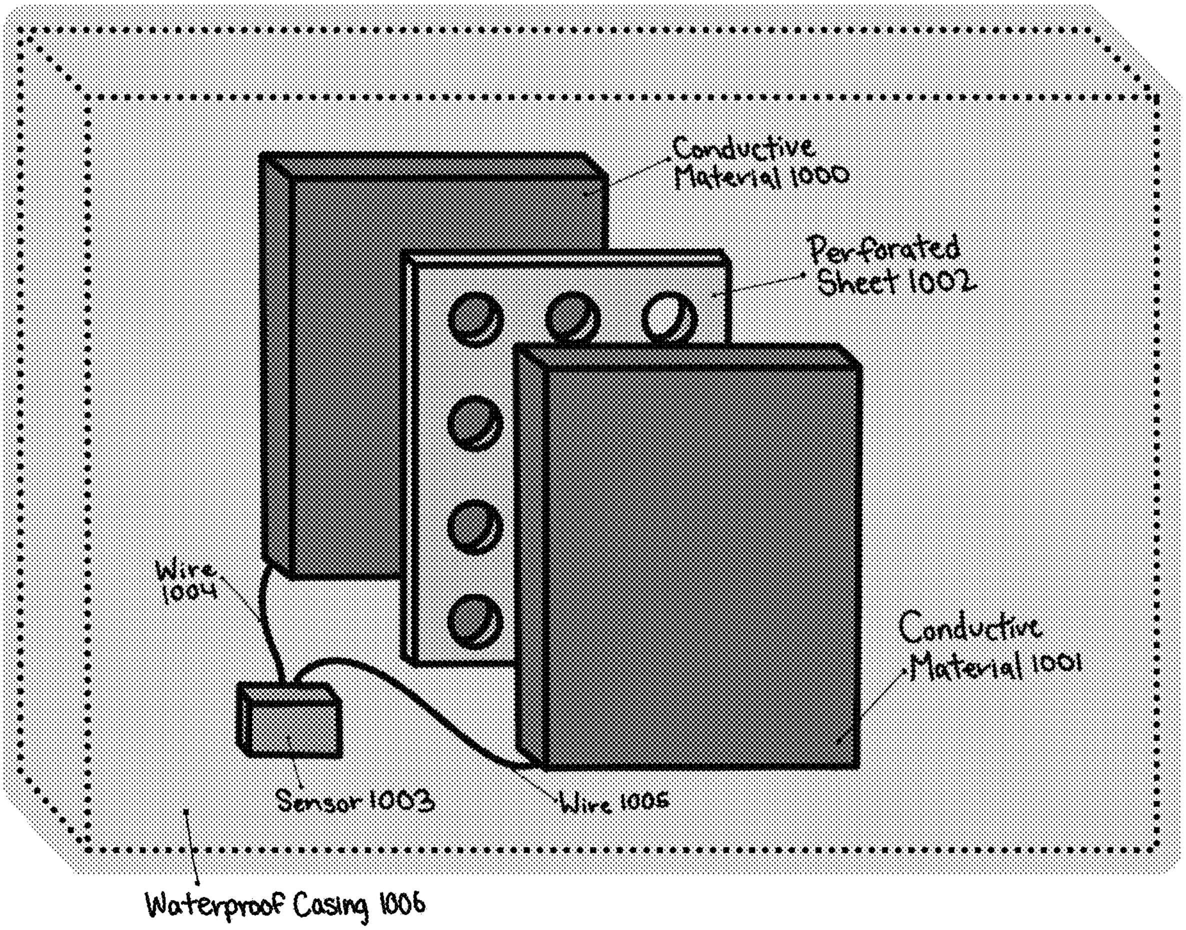
FIG. 10 shows one embodiment of the materials and construction of a pressure-sensitive pad in a step pad subsystem of a step pad door lock system.

FIG. 10 shows one embodiment of step pad 403, in which step pad 403 includes conductive material 1000 and conductive material 1001, both being conductive sheets separated by perforated sheet 1002. Perforated sheet 1002 may be a perforated, non-conductive insulation sheet. Together, the conductive material 1000, conductive material 1001 and perforated sheet 1002 comprise a mat. When sufficient pressure is applied on the mat, such as a human step, sensor 1003 registers that the conductive points on conductive material 1000 and conductive material 1001 touch through the perforated holes. Sensor 1003 is connected to conductive material 1000 and conductive material 1001 through wire 1004 and wire 1005. When the conductive sheets touch, a circuit is completed, acting as a button or switch to send signals to a microcontroller via Sensor 1003. Sensor 1003 may be configured to detect steps on one or more regions of the step pad. However, Sensor 1003 may alternatively be implemented as an optical, capacitive, or optical-mechanical sensor if it detects the user's steps. In one embodiment, the optical sensor may be infrared and detect a step when a user's foot gets close to the step pad. To ensure conductive material 1000 and 1001 do not falsely trigger due to water conductivity, step pad 403 also comprises of a waterproof casing 1006. Waterproof casing 1006 is a sealed enclosure made from a thin and flexible material. Said waterproof casing would also enclose the entire mat, including components such as transmitter and receiver 401 and indicator lights 405.

In the preceding description, numerous details are set forth. One of ordinary skill in the art would know that the present invention can be implemented in hardware, software, or combinations thereof. It will also be apparent to one skilled in the art, that the present invention may be practiced without these specific details. In some instances, well-known structures and devices are shown in block diagram form, rather than in detail, in order to avoid obscuring the present invention.

I claim:

1. An apparatus configured to lock or unlock doors by detecting a pattern of steps, comprising:

a step pad;

a waterproof casing around an entirety of the step pad;

a step pad sensor configured to detect steps on one or more regions of the step pad;

a step pad transmitter configured to send a signal from said step pad sensor responsive to detection of the pattern of steps, wherein the signal is based on the pattern of steps;

a deadbolt microcontroller configured to receive said signal from said step pad transmitter;

a deadbolt transmitter configured to send a signal from said step pad to the deadbolt microcontroller;

a deadbolt motor configured to receive a lock/unlock signal from said deadbolt microcontroller; and a deadbolt that at least one of locks or unlocks under control of said deadbolt motor.

2. The apparatus of claim 1, wherein the step pad sensor is beneath the step pad and is not visible while the step pad is faceup on a surface.

3. An apparatus configured to lock or unlock doors by detecting a pattern of steps, comprising:

a step pad, wherein the step pad is composed of a completely sealed enclosure made of a thin and flexible material;

a step pad sensor configured to detect steps on one or more regions of the step pad;

a step pad transmitter configured to send a signal from said step pad sensor responsive to detection of the pattern of steps, wherein the signal is based on the pattern of steps;

a deadbolt microcontroller configured to receive said signal from said step pad transmitter;

a deadbolt transmitter configured to send a signal from said step pad to the deadbolt microcontroller;

a deadbolt motor configured to receive a lock/unlock signal from said deadbolt microcontroller; and a deadbolt that at least one of locks or unlocks under control of said deadbolt motor.

4. The apparatus of claim 1, further comprising:

one or more indicator lights that provide visual feedback of operation of the apparatus.

5. The apparatus of claim 1, further comprising a battery to provide power to the apparatus.

6. The apparatus of claim 1, wherein the step pad comprises a perforated insulating layer between two conducting layers.

7. The apparatus of claim 6, wherein the step pad sensor comprises an electrical sensor configured to detect when the two conducting layers are in contact via perforations of the perforated insulating layer.

8. The apparatus of claim 1, wherein the step pad sensor comprises a capacitive sensor.

9. The apparatus of claim 1, wherein the step pad sensor comprises an optical sensor.

10. The apparatus of claim 1, wherein the step pad sensor comprises an optical-mechanical sensor.

11. A method for locking and unlock doors using a mat-based lock system by detecting a pattern of steps, comprising:

receiving a sequence of signals from a pressure-sensitive step pad, each signal of the sequence of signals representing a step on said pressure-sensitive step pad;

measuring a length of time each signal is active and storing as a sequence of step event lengths;

comparing said sequence of step event lengths to a stored password sequence of durations via a step pad microprocessor;

responsive to determining that the sequence of step event lengths matches a stored password sequence within one or more predetermined time leeways, transmitting a lock or unlock signal from the step pad microprocessor to a deadbolt receiver, which causes a deadbolt to lock or unlock; and entering a sleep mode responsive to lack of an input for a threshold amount of time, wherein power consumption of the mat-based lock system is reduced during the sleep mode.

12. The method of claim 11, further comprising:

responsive to determining that the sequence of step event lengths fails to match the stored password sequence within the one or more predetermined time leeways, failing to transit the lock or unlock signal from a deadbolt microcontroller to a deadbolt motor.

13. The method of claim 11, further comprising:

receiving a request from an application to change the stored password sequence; and changing the stored password sequence.

14. The method of claim 13, wherein changing the stored password sequence comprises:

entering a password update mode;

receiving a new sequence of signals from the pressure-sensitive step pad during the password update mode;

converting the new sequence of signals to a new sequence of step event lengths that hold a length of time each signal was active in the step pad microprocessor; and changing the stored password sequence in accordance with the new sequence of step event lengths from the pressure-sensitive step pad.

15. The method of claim 14, further comprising:

prompting a user to repeat a sequence of steps that generated the new sequence of signals;

receiving an additional sequence of signals from the pressure-sensitive step pad;

converting the additional sequence of signals to an additional sequence of step event lengths; and comparing the additional sequence of step event lengths to the new sequence of step event lengths, wherein the stored password sequence is changed responsive to determining that the additional sequence of step event lengths matches the new sequence of step event lengths.

16. The method of claim 14, further comprising:

receiving a command to enter the password update mode from a user application paired with the mat-based lock system, wherein the password update mode is entered responsive to receiving the command.

17. The method of claim 11, further comprising:

detecting a step on the pressure-sensitive step pad;

exiting the sleep mode; and flashing indicator lights.

18. The method of claim 11, wherein the sequence of step event lengths is generated based on at least one of one or more regions of the pressure-sensitive step pad on which a user has stepped, or durations of steps on the pressure-sensitive step pad.

* * * * *